US008157293B2

(12) United States Patent
Bhatt et al.

(10) Patent No.: US 8,157,293 B2
(45) Date of Patent: Apr. 17, 2012

(54) SECURITY PRINTING AND DETECTING SYSTEMS AND METHODS

(75) Inventors: Jayprakash C. Bhatt, Corvallis, OR (US); Matthew Thornberry, Corvallis, OR (US); Tienteh Chen, San Diego, CA (US); Erick B. Kinas, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1216 days.

(21) Appl. No.: 11/787,897

(22) Filed: Apr. 17, 2007

(65) Prior Publication Data

US 2008/0258454 A1 Oct. 23, 2008

(51) Int. Cl.

| | |
|---|---|
| ***B42D 15/10*** | (2006.01) |
| ***B42D 15/00*** | (2006.01) |
| ***G09C 3/00*** | (2006.01) |

(52) U.S. Cl. ................ 283/72; 283/70; 283/74; 283/87; 283/89; 283/91; 283/110; 283/901

(58) Field of Classification Search .................... 281/51; 283/70, 72, 74, 87, 89, 91, 94, 107, 109, 283/110, 117, 901

See application file for complete search history.

(56) References Cited

U.S. PATENT DOCUMENTS

| | | | | |
|---|---|---|---|---|
| 4,504,083 | A * | 3/1985 | Devrient et al. | 283/87 |
| 5,020,831 | A | 6/1991 | Benardelli | |
| 5,830,529 | A | 11/1998 | Ross | |
| 6,358,607 | B1 | 3/2002 | Grotzner et al. | |
| 6,643,001 | B1 | 11/2003 | Faris | |
| 6,727,318 | B1 | 4/2004 | Mathauer et al. | |
| 6,913,793 | B2 | 7/2005 | Jiang et al. | |
| 6,974,917 | B2 | 12/2005 | Hattori et al. | |
| 7,089,420 | B1 * | 8/2006 | Durst et al. | 283/72 |
| 7,098,898 | B2 | 8/2006 | Hattori et al. | |
| 7,176,255 | B2 | 3/2007 | Mathauer et al. | |

* cited by examiner

*Primary Examiner* — Edward Tolan
*Assistant Examiner* — Justin Lewis

(57) ABSTRACT

A method of security printing can comprise the steps of printing a transparent ink onto a portion of a coated substrate resulting in printed region and an unprinted region, where the transparent ink is devoid of dyes, pigments, ceramics, metallics, and fluorescents; illuminating both the printed region and the unprinted region of the substrate, where the printed region scatters more light than the unprinted region creating a contrast; and detecting the contrast with a sensor that is sensitive to detecting light scattering differences between the printed region and the unprinted region.

26 Claims, No Drawings

SECURITY PRINTING AND DETECTING SYSTEMS AND METHODS

BACKGROUND OF THE INVENTION

Security printing methods have used invisible inks as a means of verifying data or providing additional information relating to documents. Invisible inks have been known for quite some time. In the past, invisible ink has typically been used to write secret messages and/or codes, and is configured to become visible upon treatment with heat and/or chemicals. Invisible inks are often still used as novelty items, children's toys, and for encoded data, where the invisible ink can be developed to become visible by employing appropriate chemistry.

As ink-jet technology has become widespread and readily available, various security techniques including the use of invisible inks have been utilized in conjunction with ink-jet printing. Such invisible inks have included the use of specialized dyes or pigments. For example, such dyes include UV or near infra red dyes. Additionally, metallic or ceramic particles having unique optical, electrical, or magnetic properties have been employed in security printing mechanisms configured for ink-jet printing. However, security measures employing such sophisticated techniques can be quite costly employing expensive chemicals. Accordingly, investigations continue into developing cost-effective security printing methods that can be employed in the ink-jet arts.

DETAILED DESCRIPTION OF THE PREFERRED EMBODIMENT(S)

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that, as used in this specification and the appended claims, the singular forms "a," "an," and "the" include plural referents unless the context clearly dictates otherwise. Thus, for example, reference to "an ink" includes one or more of such inks, reference to "an amount of dyes" includes reference to one or more amounts of dyes, and reference to "the region" includes reference to one or more regions.

As used herein, "liquid vehicle" or "ink vehicle" refers to the liquid fluid in which a "colorant" may be placed to form a colored or invisible ink. Liquid vehicles are known in the art of ink-jet printing, and a wide variety of ink vehicles may be used with the systems and methods of the present invention. Such vehicles may include a mixture of a variety of different agents, including co-solvents, buffers, biocides, sequestering agents, viscosity modifiers, surface-active agents (surfactants), water, etc.

As used herein, "colorant" can include dyes, pigments, and/or other particulates, whether providing visible or invisible images that may be suspended or dissolved in a liquid vehicle.

As used herein, "visible ink" refers to a liquid vehicle that contains at least one colorant visible to the naked eye.

As used herein "invisible ink" refers to traditional invisible inks that are not visible to the naked eye, but which utilize dyes, pigments, fluorescents, ceramics or metallics for detection, etc. This term also includes those inks that become visible after treatment with another composition.

As used herein, "transparent ink" refers to liquid vehicles that are substantially invisible to the naked eye and do not contain dyes, pigments, ceramics, metallics, and fluorescents.

As used herein, "media substrate" or "substrate" includes any substrate that can be used in the ink-jet printing arts including papers, overhead projector plastics, coated papers, fabric, art papers (e.g. water color paper), and the like.

As used herein, "plurality" refers to more than one. For example, a plurality of solvents refers to at least two solvents.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that it would be advantageous to develop security ink methods and systems that are cost effective. In accordance with this, the present invention is drawn to methods and systems of security printing utilizing transparent ink compositions. It is noted that when discussing a method of formulating a transparent ink or using a transparent ink in a security printing system, each of these discussions can be considered applicable to each of these embodiments, whether or not they are explicitly discussed in the context of that embodiment. Thus, for example, in discussing a sensor for detecting a contrast between printed and unprinted regions, the sensor can be used in a method of using transparent inks for security printing or a system of security printing, and vice versa.

In a first embodiment, a method of security printing and detecting can comprise printing a transparent ink onto a portion of a substrate resulting in printed region and an unprinted region; illuminating both the printed region and the unprinted region of the substrate, wherein the printed region scatters more light than the unprinted region creating a contrast; and detecting the contrast with a sensor that is sensitive to detecting light scattering differences between the printed region and the unprinted region.

In another embodiment, a security ink system can comprise a coated substrate having a coating which comprises inorganic pigments; a transparent ink comprising a liquid vehicle which is devoid of dyes, pigments, ceramics, metallics, and fluorescents; and a sensing device configured to illuminate and detect at least a 5% difference in light scattering between a printed region that has been printed with the transparent ink and an unprinted region that has not been printed with the transparent ink. The transparent ink can be formulated for printing on the coated substrate.

The transparent ink can be a liquid vehicle without the presence of dyes, pigments, ceramics, metallics, and fluorescents, as are typically found in typical invisible ink compositions. In other words, even though the transparent ink can be substantially invisible to the naked eye, it does not require typical additives as found in numerous invisible inks in the art in order to function as a security ink. The transparent ink does not rely on special chemicals or compounds in order to be detected. The transparent ink can be a typical ink composition absent colorants or specialized components typically used in invisible ink compositions. In one embodiment, the transparent ink can include chelating agents or sequestering agents, biocides, fungicides, buffers, cosolvents, or stabilizers. The transparent ink may contain other additives as is well known in the ink-jetting arts which do not function as a means of detection. Even though the transparent ink of the present invention can be generally invisible, the transparent inks can also be visible to the naked eye when held against a dark background.

The transparent ink can be detected by its light scattering properties. Any transparent ink composition can be used in the methods and systems of the present invention that has the ability to scatter more light than an underlying substrate. Generally, the transparent ink can reflect more light than the substrate, and therefore, transmit less light than the substrate. In one embodiment, the transparent ink can scatter at least 5% more light than the substrate. In another embodiment, the transparent ink can scatter at least 10% more light than the substrate. In yet another embodiment, the transparent ink can scatter at least 15% more light than the substrate. In yet another embodiment, the transparent ink can scatter from about 5% to about 20% more light than the substrate. The method of detection can include the use of an illumination device and sensor able to detect differences in light scattering which includes, but is not limited to, a UV-visible spectrophotometer or LED sensor assembly.

When using an LED sensor assembly, an LED can illuminate the print medium and a sensor can be used to read the difference in light at various wavelengths, such as 450-700 nm. In one embodiment, the LED illumination device can be a Red 570 nm LED illumination device. In another embodiment, the LED illumination device can be a Green 640 LED illumination device. Generally, the LED illuminating device can employ light in various wavelengths including between 300-1000 nm. The sensor assembly can measure the difference in reflected light or transmitted light. Various sensors can be used in conjunction with the LED illuminating device. For example, diffuse or specular light-to-voltage converters can be used.

The transparent ink can be used in various ink-jet technologies, including ink-jet printing, offset printing, gravure printing, micro-printing, various types of direct and indirect printing, etc. Accordingly, the transparent ink can optionally be used with standard visible ink-jet inks. For example, the transparent ink can be used in an ink set that contains a visible black ink forming an ink set capable of security printing as well as visible printing. Additionally, the transparent ink can be used with standard ink sets commercially available including various colored ink sets. The transparent ink can be used with a plurality of inks forming various ink sets of up to 6 inks or more. The systems and method of the present invention can utilize a combination of transparent inks and colored or black inks to create security features. For example, information or markings generated using transparent ink can be correlated to the information or markings generated by colored or black inks, thereby providing security features of a visible and transparent nature. Further, the transparent ink can be printed independently on other visible printed images or in conjunction with such images. For example, the transparent ink may be printed in a specific area of the document in such a manner as to provide validation information or other supporting data when read by an appropriate sensor configured to read the transparent ink in that specific region. Similarly, the transparent ink may be printed at various locations throughout the document. The sensor may be configured to read certain locations of the document or be able to read the document in its entirety. The transparent ink may be printed in conjunction with visible text. For example, the transparent ink may be printed above or below text. The transparent ink may be printed in various shapes and sizes. For example, the transparent ink can be printed as a barcode, text, or a validating image.

The substrate that receives the transparent ink can be any as is known in the printing arts. For example, the substrate can be any media substrate, such as, but not limited to, polyethylene or polypropylene extruded photographic paper, coated paper, cast coated paper, plain paper, or plastic film such as polyethyleneterephthalate (PET). Inorganic particulate coated media can be used in some more specific embodiments. In one embodiment for exemplary purposes, the substrate can be a polyethyleneterephthalate (PET) substrate. The substrate can be coated with inorganic pigments such as, but not limited to, fumed silica, colloidal silica, bohemite, precipitated alumina, fumed alumina, and colloidal aluminum. In one embodiment, the substrate can be coated with fumed silica. In one embodiment, the substrate can be coated with at least 10 to 40 g/m$^2$ of inorganic pigments, along with other appropriate binders. Examples of fumed silica that can be used in the present invention include, but are not limited to, Cab-O-Sil LM-150, Cab-O-Sil M-5, Cab-O-Sil MS-55, Cab-O-Sil H-5, Cab-O-Sil EH-5, Aerosil 150, Aerosil 200, Aerosil 250, Aerosil 300, Aerosil 350, Aerosil 400, Orisil 250, Orisil 300, Orisil 350, and Orisil 400, Orisil 150, Orisil 200, Orisil 250, Orisil 300, Orisil 350, etc. Examples of the binders include polyvinylalcohol, cationic polyvinylalcohol, acetoacetylated polyvinylalcohol, polyvinylpyrrolidone, gelatin, copolymer of polyvinylalcohol and polyvinylamine, copolymer of polyalcohol and polyvinylpyrrolidone, starch, cellulose and derivatives of cellulose, chitosen, and polymer latex such as polyacrylate, poly(styrene-co-butadiene), poly(vinyl acetate-co-butyl acrylate), etc. In one embodiment, fumed silica can be cationic charged below pH 6.0. Methods to attach cationic charge to the surface of fumed silica and aluminum silica include, but are not limited to, treating the silica with aluminum chlorohydrate (ACH), salts of aluminum salts, zirconium salts, and titanium salts, and organic silane coupling agents containing primary, secondary, tertiary, or quaternary ammonium salts.

In each of the above embodiments, typical ink vehicle formulations that can be used with the methods and systems of the present invention can include water and one or more co-solvent, present in total at from 5.0 wt % to 50.0 wt % by weight. One or more non-ionic, cationic, and/or anionic surfactant can also be present, and if present, can be included at from 0.01 wt % to 10.0 wt %. Other vehicle components known in the art such as biocides, viscosity modifiers, materials for pH adjustment, sequestering agents, preservatives, latexes, polymers, and the like, can also be present.

Classes of solvents or co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, 1-6-alcohols, ethylene glycol alkyl ethers, propylene glycol alkyl ethers, polyethylene glycol alkyl ethers, substituted and unsubstituted lactams, N-alkyl caprolactams, unsubstituted caprolactams, both substituted and unsubstituted formamides, both substituted and unsubstituted acetamides, and the like. Specific examples of solvents that can be used include 1-(2-Hydroxyethyl)-2-pyrrolidinone, 2-pyrrolidinone, and 1,6-Hexanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R. T. Vanderbilt Co.), Proxel (ICI America), and combinations thereof.

Sequestering agents such as EDTA (ethylene diamine tetra acetic acid) may be included to eliminate the deleterious effects of heavy metal impurities, and buffer solutions may be used to control the pH of the ink. From 0.001% to 2.0% by weight, for example, of either of these components can be used. Viscosity modifiers and buffers may also be present, as well as other additives known to those skilled in the art to modify properties of the ink as desired. Such additives can be present at from 0.01% to 20% by weight.

EXAMPLES

The following examples illustrate various aspects of the methods and systems in accordance with embodiments of the present invention. The following examples should not be considered as limitations, but merely teach of the best known embodiments consistent with the present invention.

Example 1

Preparation of Silica-Based Coated Substrate

A clear PET substrate is coated to obtain a porous surface similar to those found in typical micro-porous ink-jet photo media. The coating fluid primarily includes an aqueous suspension of submicron silica particles and partially hydrolyzed polyvinyl alcohol (PVA) as a binder. The coating fluid is applied on a clear PET substrate using a wire-rod coating method. The coated substrate, when held against a dark background, appears slightly hazy due to its light scattering surface. The coating fluid used is prepared in accordance with Table 1, as follows:

TABLE 1

| Coating Component | Parts |
|---|---|
| Cab-O-Sil MS-55 (fumed silica) | 100 |
| n-butylaminopropyltrimethoxysilane | 10 |
| Poval 235 (polyvinylalcohol, DP = 3000) | 18 |
| Boric Acid (100%) | 2.5 |
| Surfactant (5%) | 1 |
| Silwet L-7600* (surfactant) | 0.5 |

*Cab-O-Sil is trade name of Cabot Corp.

*Silwet is trade name of GE Silicones.

*Poval is trade name of Kuraray Chemicals.

The % solid of the coating formulation is 17% and the coat weight is 25 g/m$^2$.

Example 2

Preparation of Transparent Ink Formulation

A transparent ink composition is formulated in accordance with Table 2. The formulation can be modified to increase its light scattering properties by incorporating hygroscopic solvents that can disrupt the PVA hydrogen bonding with the coated substrate, as formulated in Table 1.

TABLE 2

| Ink Component | Wt % |
|---|---|
| Solvent Vehicle | 5-25 wt % |
| 2-pyrrolidinone | |
| 1-hydroxyethyl-2-pyrrolidinone | |
| 1,5-pentanediol | |
| 2-ethyl-2-((hydroxymethyl)-1,3-propanediol) | |
| Anti-Flocculant | 5-15 wt % |
| 3-(N-morpholino)propanesulfonic acid | 0.05-3.0 wt % |
| EDTA | 0.05-2.0 wt % |
| Surfactants | 0.05-3.0 wt % |
| Biocide | 0.05-2.0 wt % |
| DI Water | balance |

Example 3

Light Scattering Data

Table 3 represents the light scattering properties of the coated media sheet of Example 1, compared to the transparent ink formulation of Example 2 as printed on the coated media sheet of Example 1, measured in reflected light using a UV-Vis spectrophotometer:

TABLE 3

| Wavelength (nm) | Printed Region (% Reflectance) | Unprinted Region (% Reflectance) | % Scattering Difference | Clear PET (% Reflectance) | % Scattering Difference |
|---|---|---|---|---|---|
| 750 | 17.68 | 12.55 | 5.13 | 9.81 | 7.87 |
| 700 | 19.80 | 13.56 | 6.23 | 9.61 | 10.18 |
| 650 | 22.41 | 14.79 | 7.62 | 9.43 | 12.98 |
| 600 | 25.84 | 16.62 | 9.21 | 9.35 | 16.49 |
| 550 | 30.17 | 18.97 | 11.20 | 9.34 | 20.83 |
| 500 | 35.73 | 22.43 | 13.29 | 9.26 | 26.47 |
| 450 | 42.75 | 27.03 | 15.72 | 9.17 | 33.58 |
| 400 | 51.25 | 33.23 | 18.02 | 9.42 | 41.83 |

The data shows that the percent difference for a coated substrate compared to a printed region on the coated substrate can be at least 5%, and can be from about 5% to about 20%. The difference can be even greater for an uncoated substrate. The data shows that a clear PET substrate reflects less light, and therefore, the difference between a printed region and a clear unprinted PET region can be at least 5% and can be from about 5% to about 45%.

Table 4 represents the light scattering properties of the coated media sheet of Example 1, compared to the transparent ink formulation of Example 2 as printed on the coated media sheet of Example 1, measured in transmitted light using a UV-vis spectrophotometer:

TABLE 4

| Wavelength (nm) | Printed Region (% Transmitted) | Unprinted Region (% Transmitted) | % Scattering Difference | Clear PET (% Transmitted) | % Scattering Difference |
|---|---|---|---|---|---|
| 750 | 70.28 | 83.00 | 12.72 | 91.65 | 21.37 |
| 700 | 65.49 | 79.33 | 13.84 | 90.40 | 24.91 |
| 650 | 59.00 | 75.23 | 16.24 | 89.80 | 30.80 |
| 600 | 51.17 | 70.68 | 19.51 | 89.90 | 38.73 |
| 550 | 41.49 | 64.16 | 22.67 | 89.56 | 48.08 |
| 500 | 30.78 | 55.61 | 24.83 | 88.93 | 58.15 |
| 450 | 19.22 | 44.59 | 25.36 | 88.31 | 69.09 |
| 400 | 8.97 | 30.64 | 21.67 | 86.20 | 77.23 |

The data shows that the percent difference for a coated substrate compared to a printed region can be at least 5%, and can be from about 5% to about 20%. The difference can be even greater for an uncoated substrate. The data shows that a clear PET substrate transmits more light, and therefore, the difference between a printed region and a clear unprinted PET region can be from at least 5% and can be from about 15% to about 75%.

Of course, it is to be understood that the above-described formulations and arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A method of security printing and detecting, comprising:

a) printing a transparent ink onto a portion of a substrate resulting in printed region and an unprinted region, said transparent ink devoid of dyes, pigments, ceramics, metallics, and fluorescents;

b) illuminating both the printed region and the unprinted region of the substrate, wherein the printed region scatters more light than the unprinted region creating a contrast; and c) detecting the contrast with a sensor that is sensitive to detecting light scattering differences between the printed region and the unprinted region.

2. The method of claim 1, wherein the substrate is a coated substrate.

3. The method of claim 2, wherein the coated substrate includes inorganic pigments in its coating.

4. The method of claim 1, wherein the sensor includes a UV-visible spectrophotometer.

5. The method of claim 1, wherein the sensor includes a LED sensor assembly.

6. The method of claim 5, wherein the LED sensor assembly includes a 570 nm or 640 nm LED illuminating device.

7. The method of claim 1, wherein the printed region is substantially invisible to the naked eye.

8. The method of claim 1, further comprising the step of printing a visible ink on the substrate.

9. The method of claim 8, wherein the visible ink printed on the substrate provides a security feature that correlates to the transparent ink printed on the substrate.

10. The method of claim 1, wherein the contrast is measured using transmitted light.

11. The method of claim 10, wherein the transmitted light of the printed region is about 5% to about 20% less than the transmitted light of the unprinted region.

12. The method of claim 1, wherein the contrast is measured using reflected light.

13. The method of claim 12, wherein the reflected light of the printed region is about 5% to about 20% more than the reflected light of unprinted region.

14. The method of claim 1, wherein the printing is by ink-jet printing.

15. The method of claim 1, wherein the printed and unprinted regions comprise a barcode.

16. A security ink system, comprising:

a) a coated substrate having a coating which comprises inorganic pigments;

b) a transparent ink comprising a liquid vehicle which is devoid of dyes, pigments, ceramics, metallics, and fluorescents, said transparent ink formulated for printing on the coated substrate; and c) a sensing device configured to illuminate and detect at least a 5% difference in light scattering between a printed region that is printed with the transparent ink and an unprinted region that is not been printed with the transparent ink.

17. The system of claim 16, wherein the sensing device comprises a UV-visible spectrophotometer or LED sensor assembly.

18. The system of claim 17, wherein the LED sensor assembly includes a 570 nm LED or 640 nm LED illuminating device.

19. The system of claim 16, wherein the printed region is substantially invisible to the naked eye.

20. The system of claim 16, wherein the sensing device is configured to detect at least a 10% difference in light scattering between the printed region and the unprinted region.

21. The system of claim 16, wherein the contrast is measured by transmitted light or reflected light.

22. The system of claim 21, wherein the transmitted light of the printed region is 5% to 20% less than the transmitted light of the unprinted region.

23. The system of claim 21, wherein the reflected light of the printed region is 5% to 20% more than the reflected light of the unprinted region.

24. The system of claim 16, wherein the security printing system is configured for inkjet printing.

25. The system of claim 16, wherein sensing device is configured to detect at least a 15% difference in light scattering.

26. The system of claim 16, wherein the printed and unprinted regions comprise a barcode.

* * * * *